United States Patent [19]

Ravaine et al.

[11] Patent Number: 4,923,950

[45] Date of Patent: May 8, 1990

[54] COMPOSITIONS BASED ON DERIVATIVES OF SILICA MODIFIED BY ORGANIC GROUPS, PREPARATION AND APPLICATION THEREOF, PARTICULARLY AS CATIONIC CONDUCTORS

[75] Inventors: Lucienne Ravaine, Gieres; Michel B. Armand, Echirolles; Yves Charbouillot, Coligny; Abdelkader Hammou, Grenoble, all of France

[73] Assignee: Centre National de la Recherche Scientifique (CNRS), Paris, France

[21] Appl. No.: 167,474

[22] PCT Filed: Jul. 2, 1987

[86] PCT No.: PCT/FR87/00261

§ 371 Date: Apr. 28, 1986

§ 102(e) Date: Apr. 28, 1988

[87] PCT Pub. No.: WO88/00215

PCT Pub. Date: Jan. 14, 1988

[30] Foreign Application Priority Data

Jul. 2, 1986 [FR] France .................. 86 09602

[51] Int. Cl.$^5$ ............................................ C08G 77/26
[52] U.S. Cl. ...................................... 528/38; 528/30; 528/39; 556/413; 556/424; 556/427; 556/450; 556/459
[58] Field of Search ............................ 528/30, 38, 39; 556/413, 424, 427, 450, 459

[56] References Cited

U.S. PATENT DOCUMENTS 2,921,950 1/1960 Jex et al. .................. 528/38
4,238,590 12/1980 Scholze et al. .............. 528/39
4,374,696 2/1983 Schmidt et al. .............. 528/38

Primary Examiner—Melvyn I. Marquis
Attorney, Agent, or Firm—Cushman, Darby & Cushman

[57] ABSTRACT

Composition based on derivatives of silica modified by organic groups, characterized in that said derivatives are amorphous solids having formula (I) $SiO_{2-0.5(x+y)}(Z^1)_x(Z^2)_y \cdot (XA)_z$, wherein $Z^1$ is a group having formula (II), $R^1$ being an alkylene having from 3 to 8 carbon atoms optionally interrupted by a heteroatomic group —NH—, $R^3$ and $R^4$ representing each —H or representing together a group —CH=CH—N=CH—, $Z^2$ is a group —$R^2$—$SO_3H$, $R^2$ being an alkylene having from 3 to 8 carbon atoms optionally interrupted by a heteroatomic group —NH—; XZ is an acid (case where X=H) or a salt (case where X=metal) soluble in water x is a number different from 0 and lower or equal to 1; z is a number which may vary from 0 to 0.5 and not higher than x; x and y being such that the sum (x+y) is higher or equal to $\frac{1}{3}$; it being understood that the sum (x+y) is at the most equal to 1; and z is a number which is optionally nil and such that the ratio (z+y)/x is higher than 0 and lower than or equal to 1; its preparation and its application as an agent for the transmission of electromagnetic waves and/or electric currents.

15 Claims, 2 Drawing Sheets

ARRHENIUS CURVE FOR $SiO_{3/2}[(CH_2)_3NH_2](HClO_4)_{0.1}$

CONDUCTIVITY-COMPOSITION ISOTHERMS OF
$SiO_{3/2}[(CH_2)_3NH_2](HClO_4)_z$

COMPOSITIONS BASED ON DERIVATIVES OF SILICA MODIFIED BY ORGANIC GROUPS, PREPARATION AND APPLICATION THEREOF, PARTICULARLY AS CATIONIC CONDUCTORS

The present invention relates to new compositions based on silica derivatives modified by organic groups, to their preparation and to their use.

The compositions of the invention comprise polymerized gels which are in the form of amorphous solids similar to glasses.

It is known that the optical industry constantly needs to expand the selection of glasses which it is likely to use. Among the glasses which are presently being researched, mixed organic-inorganic compositions which can be obtained in the solid state and form light glasses can, in particular, be mentioned.

In addition, there is a known interest in solid ionic conductor materials, particularly for the production of electric accumulators and batteries or of completely solid specific activity gauges, or even in the production of electrochrome sensors and systems.

It is known that, apart from microelectronics, a branch of technology, called "micro-ionic", is presently being created which develops the possibilities of miniaturization of devices using the electrochemical transport of ions in ionic conductors, with a view to producing micro-sensors, micro-analyzers, micro-batteries, or read-outs, for example.

Until now, the ionic conductors proposed for these uses were principally crystalline or vitro-ceramic products whose use raised difficulties in practice. In effect, it is known that the crystallized products have expansion anomalies which render their use difficult. In addition, ceramics have a heterogeneous structure which is characterized in particular by grain boundaries which affect the electrical and mechanical properties and which decrease the life span of the system using them as solid electrolytes.

The interest in solid amorphous ionic conductors can therefore be conceived, especially since their preparation starting from gels easily enables them to be obtained in the form of thin layers.

The present invention relates to new solid amorphous and homogeneous compositions, which can be used in particular in the optical, electro-optical and electrochemical industries.

More specifically, the present invention relates to new compositions based on derivatives of silica modified by organic groups, wherein said derivatives are amorphous solids of the formula I $$SiO_{2-0.5(x+y)}(Z^1)_x(Z^2)_y \cdot (XA)_z \quad (I)$$

in which:

$Z^1$ represents

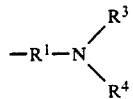

wherein $R^1$ is alkylene having 3 to 8 carbon atoms optionally interrupted by —NH—, and $R^3$ and $R^4$ each represent —H or together represent a —CH=CH—N=CH— group;

$Z^2$ represents —$R^2$—$SO_3H$ wherein $R^2$ is alkylene having 3 to 8 carbon atoms optionally interrupted by —NH—;

XA represents an acid (with X=H) or a salt of said acid (with X representing a valence of a metal), the said acid or said salt being soluble in water;

x is a non-negative number less than or equal to 1;

y is a number which can vary from 0 to 0.5 and not greater than x;

x and y are such that the sum (x+y) is greater than or equal to ⅛; and z is a number optionally 0, such that the ratio (z+y)/x is greater than zero and less than or equal to 1;

it being understood that the sum (x+y) is at most equal to 1.

It can be seen that, in formula I, when $R^3$ and $R^4$ together represent —CH=CH—N=CH—, —N($R^3$)($R^4$) is an imidazolyl group.

The base product $$SiO_{2-0.5(x+y)}(Z^1)_x(Z^2)_y$$

is derived from silica, that is, it is, like silica, a three-dimensional polymer. It can therefore be seen that in formula I, on average, each silicon atom is connected to x chains

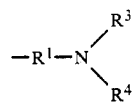

and y chains —$R^2$—$SO_3H$. In the silica derivative of formula I, due to the tetravalence of the silicon, each silicon atom is therefore on average involved in 2−0.5(x+y) bonds of the Si—O—Si type. The XA acid or salt is solvated in the modified silica polymer.

Of course, the silica-derived polymers represented by general formula I can, like silica xerogels, contain a small amount of hydroxyl end groups. This is shown by the method of preparation of the compounds of formula I which will be detailed below.

The invention relates in particular to the products of formula I for which the sum (x+y) is at least equal to 0.5 and especially to those for which x is at least equal to 0.5.

Among the products of formula I, those for which the ratio (z+y)/x is a number which can vary from 0.01 to 0.5 can particularly be cited.

Where $R_1$ does not contain a nitrogen heteroatom, this ratio is preferably less than or equal to 0.2 and can in particular vary from 0.05 to 0.2.

Where $R_1$ contains an —NH— heteroatomic group, said ratio is preferably less than or equal to 0.4 and can in particular vary from 0.1 to 0.4.

In particular embodiments, the compositions of the invention can also have the following characteristics taken separately or in combination:

$Z^1$ represents —$(CH_2)_3NH_2$, —$(CH_2)_3$—NH—$(CH_2)_2$—$NH_2$, etc.;

$Z^2$ represents —$(CH_2)_3$—$SO_3H$, —$(CH_2)_3NH(CH_2)_4SO_3H$, etc.;

the product XA (or $X^+A^-$) is an acid or a salt whose $A^-$ anion is selected for example from among the following anions:

$Cl^-$, $Br^-$, $I^-$, $NO_3^-$, $ClO_4^-$, $CF_3SO_3^-$, $SCN^-$, $BF_4^-$ $PF_6^-$, $AsF_6^-$, $CF_3CO_2^-$, $H_2PO_4^-$, $HSO_4^-$, $CH_3CO_2^-$, etc; and when X represents a metal valence, it is in particular an alkali metal, magnesium, an alkaline-earth metal or a transition metal such as copper or silver. For example X represents Li, Na, K, ½ Mg, ½ Sr, ½ Ba, ½ Cu(II), Ag, etc.

A further object of the invention is a method for the preparation of compositions such as those defined above.

This method is principally characterized by the fact that a mixture of $Si(O-Alk)_4$, $Si(O-Alk)_3Z^1$ and $Si(O-Alk)_3Z^2$ compounds, in which Alk is a lower alkyl group and which are present respectively in the amounts $(1-x-y)$, x and y (as defined above) is submitted to the action of an aqueous solution of the XA acid or salt, with the water of said solution being of a quantity sufficient to hydrolyze the alkoxysilane groups of the starting materials into corresponding silanol groups, the concentration of the XA acid or salt in relation to the silicon of the starting materials being equal to z as defined above, and, after gelification of the reaction mixture, the gel obtained is heated, to a constant weight, at a temperature greater than 100° C. and lower than the decomposition temperature of the material obtained.

The starting silanes, in which, for example, Alk represents methyl, ethyl, isopropyl, etc., are known products or can be prepared in accordance with known methods; see, for example, W. Noll "Chemie und Technologie der Silicone", Verlag Chemie GmbH (1968).

The method of the invention is therefore a method known per se by the designation of sol-gel type method, which consists, starting from a solution of organometallic derivatives, of carrying out a hydrolysis reaction, followed by a gelification, with the gelification corresponding to the polycondensation of the silanol group obtained in order to form Si—O—Si type bonds. The passage from the gel obtained to a dry gel, that is which is free of organic solvents, from the starting materials which have not reacted and other reaction products, is carried out in a second stage by means of a suitable heat treatment.

The particular object of the heat treatment is to remove the alcohols (Alk—OH) formed during the hydrolysis as well as the water formed during the polycondensation of the silanols. This treatment is carried out in a dry atmosphere, for example at 110°-160° C., and particularly around 120° C., under reduced pressure. A dried gel or "xerogel" is then obtined.

The added XA acid or salt remains solvated in the final material which is stable up to temperatures on the order of 180° C. Above that, the material starts to decompose by oxidation reactions.

The final materials generally have a density on the order of 1.3.

They are only very slightly porous, with their specific surface measured by the BET method being low, generally less than 0.025 m²/g.

These materials are amorphous, as is shown by X-ray study. They are transparent, slightly breakable, flexible, and can be obtained easily in thin films with a thickness of less than 100 μm for example. In effect, the method of the invention lends itself easily to obtaining an amorphous composition in the form of a thin layer deposited on an appropriate substrate. For this, the reaction mixture can be applied, before gelification, onto a solid substrate in accordance with known methods, for example, by centrifuging, by tempering (or "dipping") or by the pyrosol method (drawing the reaction solution, in the form of a fog, by a gas vector, to the heated substrate). The heat treatment is then carried out on the substrate coated with the deposited layer of gel.

The solid amorphous compositions of the invention have interesting optical and electrical properties.

In particular, these compositions have a conductivity which enables them to be used as ionic conductors. This conductivity is a cationic conductivity, due to the mobility of the protons of the acid introduced (case where X=H) or of the cations of the saltintroduced (in the case where XA is a metal salt). A further object of the invention is the use of the amorphous solid compositions as defined above in particular as agents for the transmission of electromagnetic waves and/or electric currents. In other words, these compositions can be used as optical glasses and/or as solid electrolytes.

In particular, these compositions can be used as solid electrolytes in various electrochemical systems, such as electric generators or batteries, sensors, electrochrome read-outs, etc.

BRIEF DESCRIPTION OF THE DRAWINGS

The graphs obtained showed a so-called "free volume" regime illustrated by FIG. 1 whee the material corresponded to formula 1 with $Z^1=(CH_2)_3-NH_2$, $HA=HClO_4$, $X=1$ $y=0$ and $z=0.1$. The isothermic variations of conductivity with the acid concentration are shown in FIG. 2 for $HA=HClO_4$.

The following examples illustrate the invention without, however, limiting its scope.

EXAMPLE 1

Figure 1:
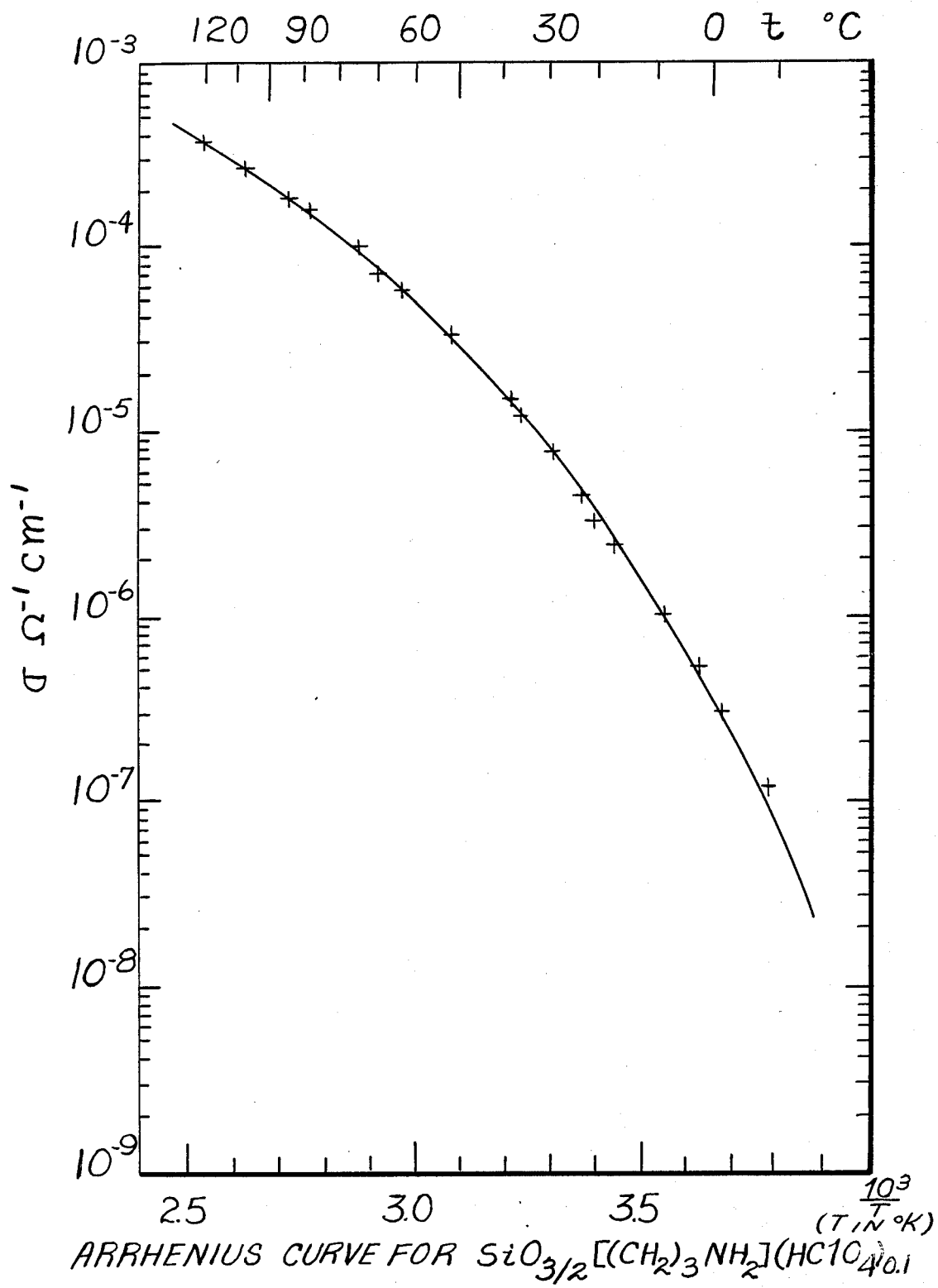
Figure 2:
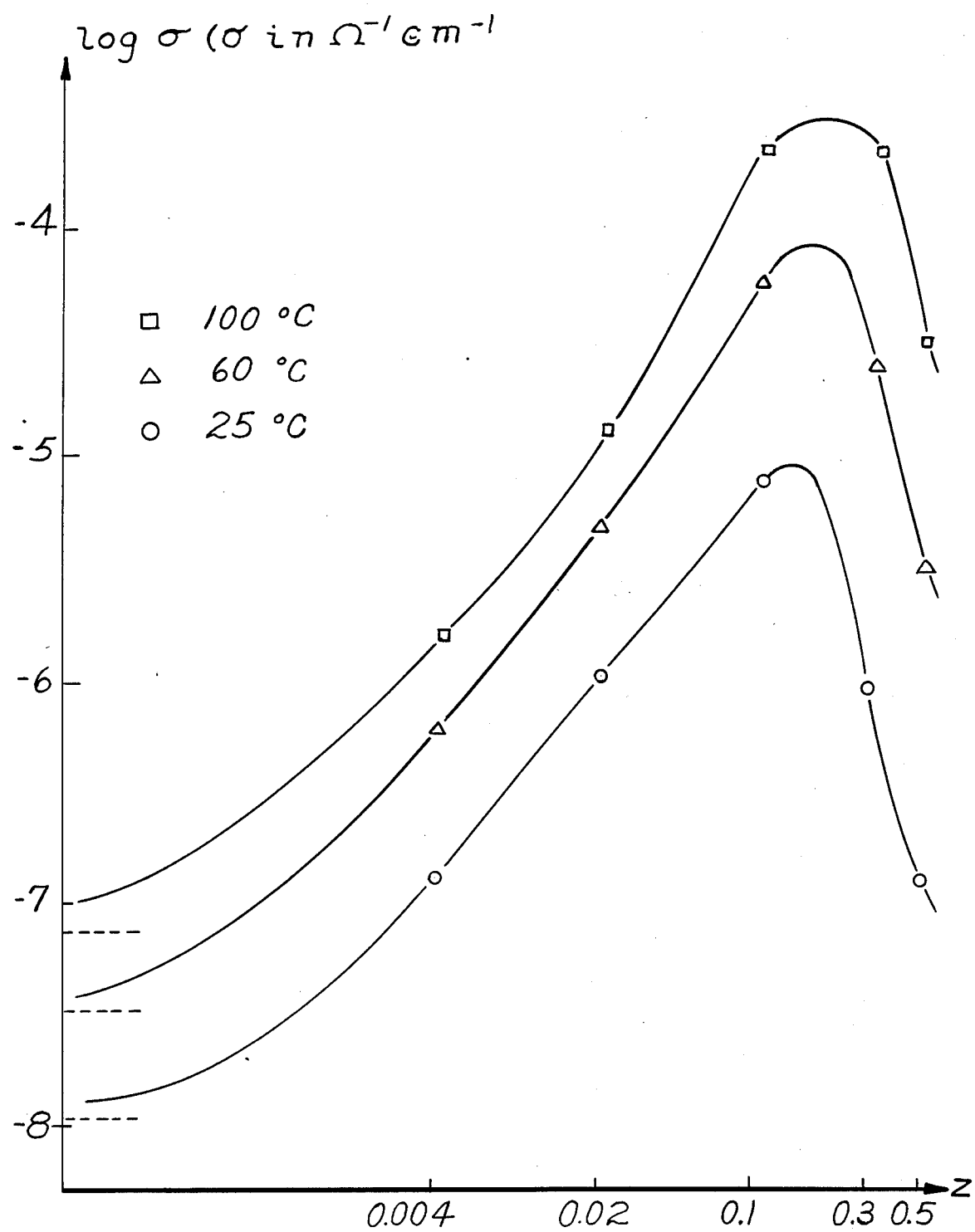

Composition of formula I, wherein $Z^1=-(CH_2)_3-NH_2$, $XA=HClO_4$, $x=1$, $y=0$ and $z=0.1$.

The following were mixed in the order given in an Erlenmeyer flask:
 0.36 cm³ of 70% perchloric acid (Prolabo Normapur)
 4.4 cm³ of distilled water and
 10 cm³ of aminopropyltriethoxysilane having the formula $(C_2H_5O)_3Si-(CH_2)_3NH_2$ (FLUKA AG)

The Erlenmeyer flask was closed and placed on a heated stirrer at a temperature close to 60° C. for 4 hours. The solution was then transferred to a polycarbonate Petri dish. This was placed in a stove at 50° C., where the gelification took place in 3 or 4 hours.

24 hours after gelification, the film was detached from the Petri dish and heat treated at 120° C. under a primary vacuum for 48 hours so as to remove the residual water.

EXAMPLE 2

The following $SiO_{3/2}Z^1(HA)_z$ compositions (Table 1) were synthesized in a similar manner:

TABLE 1

| $Z^1$ | HA | z | | | | |
|---|---|---|---|---|---|---|
| —(CH₂)₃NH₂ | HClO₄ | 0.004 | 0.02 | 0.1 | 0.3 | 0.5 |
| | HCF₃SO₃ | 0.1 | | | | |
| | HNO₃ | 0.1 | | | | |
| | HCL | 0.1 | | | | |
| | HCH₃CO₂ | 0.1 | | | | |
| —(CH₂)₃NH (CH₂)₂NH₂ | HClO₄ | 0.1 | 0.2 | 0.4 | | |
| | HCF₃SO₃ | 0.1 | 0.2 | 0.4 | | |

EXAMPLE 3

Composition of the formula $SiO_{1.5}(Z^1)_x(Z^2)y$ wherein $Z^1=-(CH_2)_3NH_2$, $Z^2=-(CH_2)_3NH(CH_2)_4SO_3H$, $x=0.9$, $y=0.1$ and $z=0$.

10 cm³ of aminopropyltriethoxysilane (FLUKA AG) and 0.45 cm³ of butane-sultone (Merck Normapur) having the formula

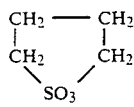

were mixed in an Erlenmeyer flask.

The Erlenmeyer flask was closed and placed on a heating stirrer at a temperature close to 60° C. for 3 days. The increase in viscosity of the solution showed that the reaction $-NH_2+(CH_2)_4SO_3\rightarrow \ldots -NH(CH_2)_4SO_3H$ had taken place.

The following were added successively:
10 cm³ of methanol (Prolabo Normapur) and
5 cm³ of distilled water.

The mixture obtained was stirred as above for 4 hours. The solution was transferred to a Petri dish. The gelification and the appearance of the film after heat treatment were similar to those described in Example 1.

EXAMPLE 4

Conductivity

The compositions of the preceding examples were the subject of a study of the conductivity as a function of the temperature. The conductivity was measured by complex impedance spectroscopy.

Table 2 below gives the conductivity values at room temperature for different compositions as well as the activation pseudo-energies $E_a$ and the fictitious vitreous transition temperatures $T_o$ calculated by adjusting experimental points with the Vogel-Tamman-Fulcher equation:

$$\sigma = AT^{-\frac{1}{2}} \exp\left[\frac{-E_a}{R(T - T_o)}\right]$$

in which:
A is the pre-exponential term, proportional to the concentration in free charge carriers,
T represents the temperature (in K) and
R represents the constant of perfect gases (R=8.314 J.K.⁻¹ mol⁻¹).

TABLE 2

| $z^1$ | HA | z | 25° C. (ohm⁻¹cm⁻¹) | $E_a$ (eV) | $T_o$ (°C.) | A (ohm⁻¹cm⁻¹K$^{\frac{1}{2}}$) |
|---|---|---|---|---|---|---|
| $-(CH_2)_3NH_2$ | $HClO_4$ | 0.004 | $1.1 \cdot 10^{-7}$ | $6.41 \cdot 10^{-2}$ | −86.4 | $1.53 \cdot 10^{-3}$ |
| | | 0.02 | $6.7 \cdot 10^{-7}$ | $7.64 \cdot 10^{-2}$ | −93.2 | $2.13 \cdot 10^{-2}$ |
| | | 0.1 | $4.9 \cdot 10^{-6}$ | $9.18 \cdot 10^{-2}$ | −85.5 | 1.32 |
| | | 0.3 | $9.8 \cdot 10^{-7}$ | $8.88 \cdot 10^{-2}$ | −59.3 | 3.00 |
| | $HCF_3SO_3$ | 0.1 | $1.4 \cdot 10^{-5}$ | $8.69 \cdot 10^{-2}$ | −85.5 | 1.19 |
| | | 0.125 | $9.0 \cdot 10^{-6}$ | $9.54 \cdot 10^{-2}$ | −88.4 | 2.75 |
| | $HNO_3$ | 0.1 | $1.0 \cdot 10^{-5}$ | $7.74 \cdot 10^{-2}$ | −85.7 | 0.61 |
| | HCl | 0.1 | $1.9 \cdot 10^{-6}$ | $4.46 \cdot 10^{-2}$ | −51.3 | $2.89 \cdot 10^{-2}$ |
| | $HCH_3CO_2$ | 0.1 | $3.6 \cdot 10^{-8}$ | $7.75 \cdot 10^{-2}$ | −97.6 | $9.67 \cdot 10^{-4}$ |
| $-(CH_2)_3NH(CH_2)_2NH_2$ | $HClO_4$ | 0.2 | $8.4 \cdot 10^{-6}$ | $9.94 \cdot 10^{-2}$ | −81.0 | 7.87 |
| | | 0.4 | $2.2 \cdot 10^{-6}$ | $8.57 \cdot 10^{-2}$ | −59.8 | 4.90 |
| | $HCF_3SO_3$ | 0.2 | $8.2 \cdot 10^{-6}$ | $9.19 \cdot 10^{-2}$ | −77.0 | 5.04 |
| | | 0.4 | $2.7 \cdot 10^{-6}$ | $8.94 \cdot 10^{-2}$ | −64.1 | 5.29 |

EXAMPLE 5

Composition of formula I, wherein

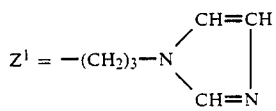

The method described in Example 1 was repeated, starting with 1 cm³ of (triethoxysilyl)propylimidazole and 525 μl of an aqueous solution of trifluoromethanesulfonic acid with 0.7 mol/l.

EXAMPLE 6

Composition of formula I, wherein
$Z^1=-(CH_2)_3NH_2$, $MA=LiClO_4$
$x=1$ $y=0$ and $z=0.1$.

The method described in Example 1 was repeated, starting with 10 cm³ of aminopropyltrimethoxysilane, 5 cm³ of distilled water and 0.602 g of anhydrous $LiClO_4$.

We claim:

1. A composition comprising a silica derivative modified by organic groups, said derivative being an amorphous solid and having the formula $$SiO_{2-0.5(x+y)}(Z^1)_x(Z^2)_y \cdot (XA)_z \quad (I)$$

wherein $Z^1$ represents

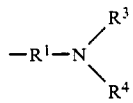

wherein
$R^1$ is alkylene having 3–8 carbon atoms optionally interrupted by —NH— and
$R^3$ and $R^4$ each represent hydrogen or taken together represent —CH=CH—N=CH—;
$Z^2$ represents —$R^2$—$SO_3H$ wherein
$R^2$ is alkylene having 3–8 carbon atoms optionally interrupted by —NH—;
XA represents an acid HA whose anion is A⁻ when X is H or a salt of said acid when X is a metal, said salt being soluble in water;
x is a non-negative number less than or equal to 1;

y is a number ranging from 0 to 0.5 but not greater than x;

x and y are such that the sum, x+y, is greter than or equal to ⅓, it being understood that the sum, x+y, is at most equal to 1; and z is a number, optionally zero, such that the ratio z+y/x is greater than zero and less than or equal to 1.

2. The composition of claim 1 wherein $Z^1$ represents —(CH$_2$)$_3$NH$_2$ or —(CH$_2$)$_3$—NH—(CH$_2$)$_2$—NH$_2$.

3. The composition of claim 1 wherein $Z^1$ represents

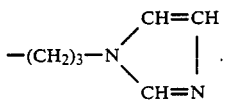

4. The composition of claim 1 wherein X represents H or an equivalent of an alkali metal, an alkaline earth metal or a transition metal.

5. The composition of claim 4 wherein said alkaline earth metal is magnesium.

6. The composition of claim 4 wherein said transition metal is copper or silver.

7. The composition of claim 1 wherein $Z^2$ represents —(CH$_2$)$_3$—SO$_3$H or —(CH$_2$)$_3$NH(CH$_2$)$_4$SO$_3$H.

8. The composition of claim 1 wherein the sum, x+y, is at least equal to 0.5.

9. The composition of claim 1 wherein x is at least equal to 0.5.

10. The composition of claim 1 wherein the ratio z+y/x is a number ranging from 0.01 to 0.5.

11. The composition of claim 10 wherein when $R^1$ does not contain —NH—, the ratio z+y/x is a number ranging from 0.05 to 0.2.

12. The composition of claim 10 wherein when $R^1$ contains —NH—, the ratio z+y/x is a number ranging from 0.1 to 0.4.

13. The composition of claim 1 wherein the anion $A^-$ is selected from the group consisting of $Cl^-$, $Br^-$, $I^-$, $NO_3^-$, $ClO_4^-$, $CF_3SO_3^-$, $SCN^-$, $BF_4^-$, $PF_6^-$, $AsF_6^-$, $CF_3CO_2^-$, $H_2PO_4^-$, $HSO_4^-$ and $CH_3CO_2^-$.

14. A method for preparing the composition of claim 1 comprising (i) subjecting a mixture of Si(O—Alk)$_4$, Si(O—Alk)$_3Z^1$ and Si(O—Alk)$_3Z^2$ compounds wherein Alk is lower alkyl and which are present in said mixture in amounts, respectively, of (1−x−y), x and y, and wherein $Z^1$, $Z^2$, x and y are as defined in claim 1, to a hydrolysis and polycondensation reaction by the action of an aqueous solution of XA, wherein XA is defined in claim 1 and wherein the water of said solution is of a quantity sufficient to hydrolyze the alkoxysilane groups of the said compounds of said mixture into corresponding silanol groups, the concentration of said XA relative to the silicon of said compounds of said mixture being equal to z wherein z has the meaning given in claim 1, and (ii) after completion of the reaction in (i), heating the resulting gel to a constant weight at a temperature greater than 100° C. and lower than the decomposition temperature of the material obtained.

15. The method of claim 14 wherein Alk is methyl, ethyl or isopropyl.

* * * * *